Figure 1:
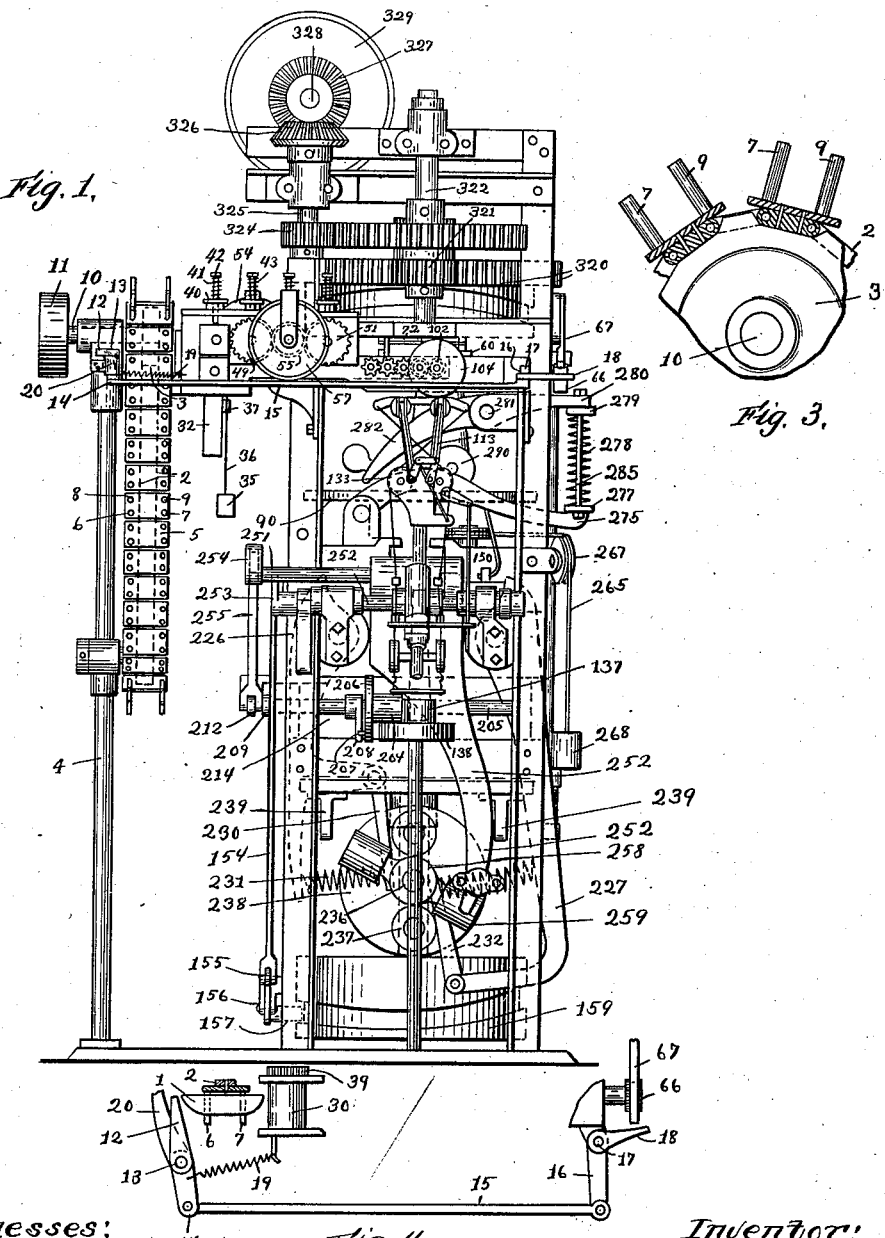

A. F. JONES.
COUNTER FORMING MACHINE.
APPLICATION FILED MAY 26, 1909.

1,014,226.

Patented Jan. 9, 1912.

8 SHEETS—SHEET 2.

A. F. JONES.
COUNTER FORMING MACHINE.
APPLICATION FILED MAY 26, 1909.
1,014,226.
Patented Jan. 9, 1912.
8 SHEETS—SHEET 3.
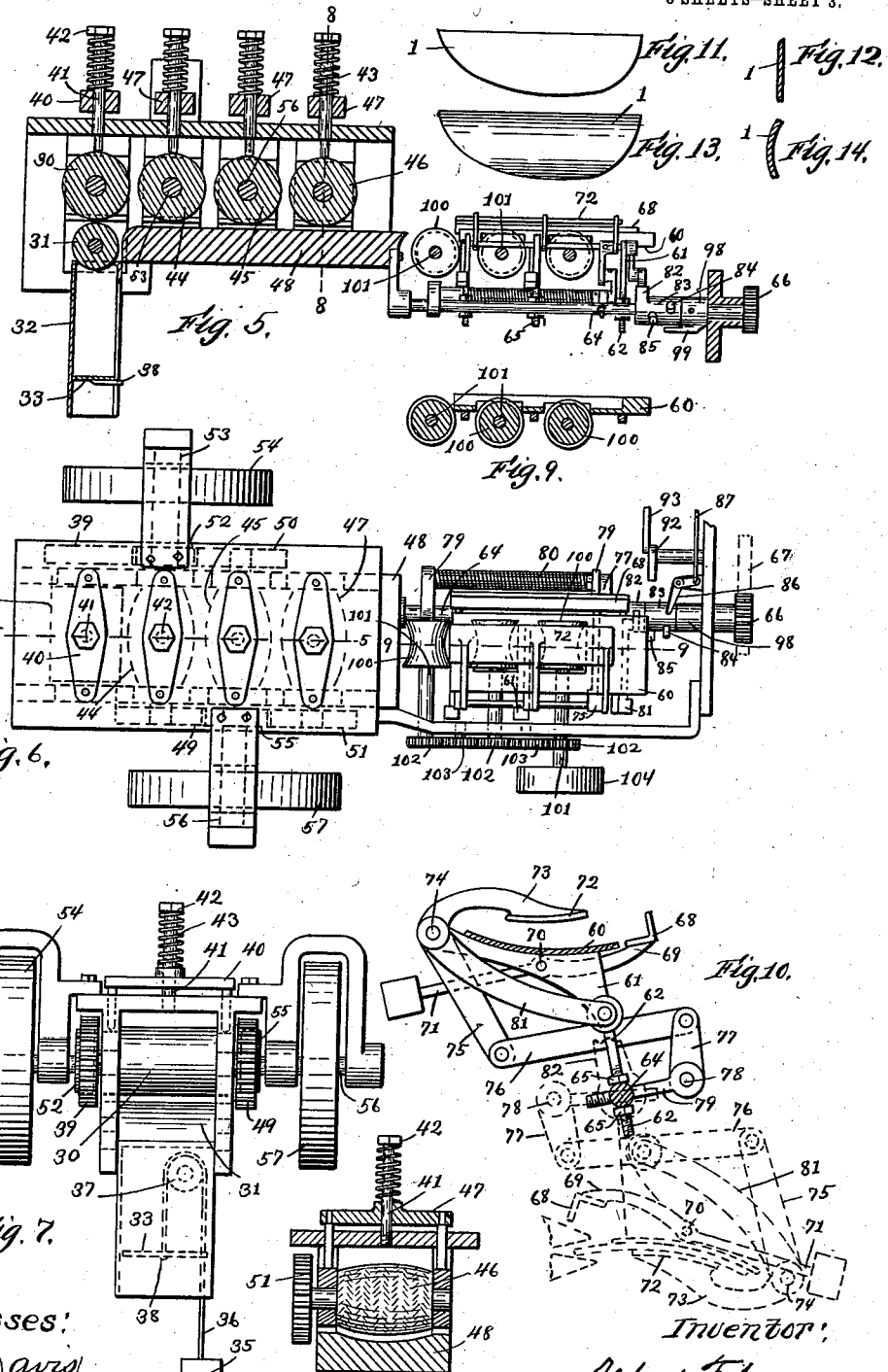

A. F. JONES.
COUNTER FORMING MACHINE.
APPLICATION FILED MAY 26, 1909.

1,014,226.

Patented Jan. 9, 1912.
8 SHEETS—SHEET 4.

Witnesses:
H. B. Davis.
Cynthia Doyle.

Inventor:
Albert F. Jones
by Ayres & Harriman
Attys.

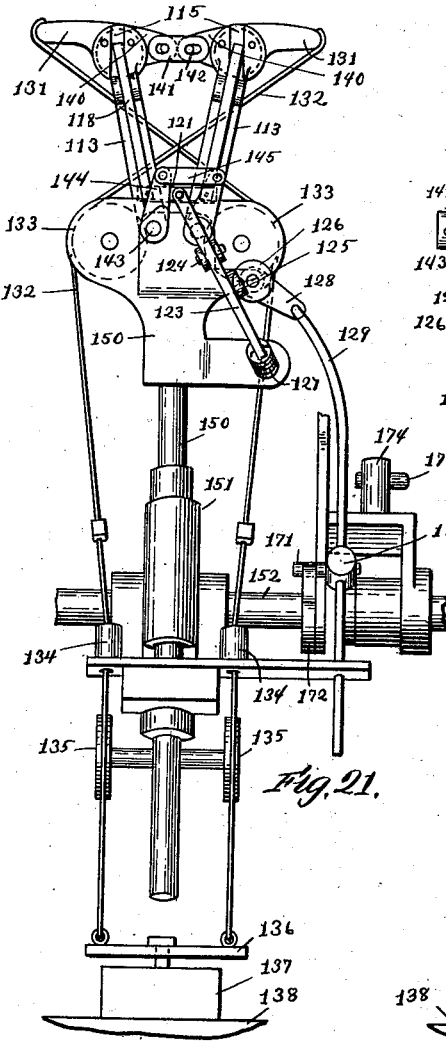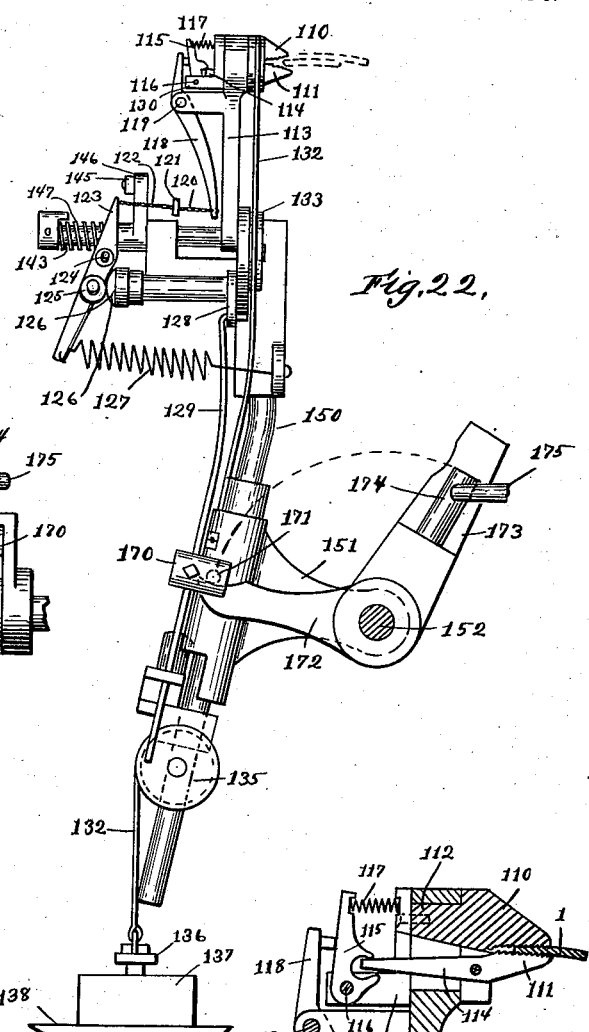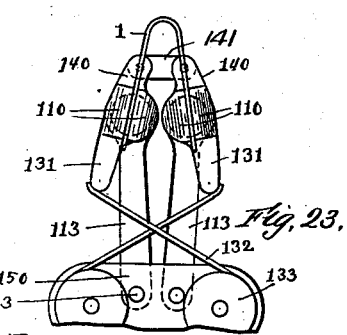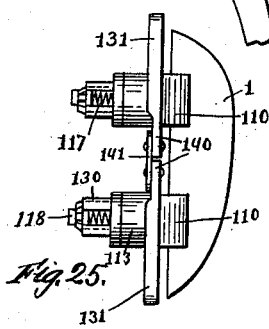

A. F. JONES.
COUNTER FORMING MACHINE.
APPLICATION FILED MAY 26, 1909.

1,014,226.

Patented Jan. 9, 1912.

8 SHEETS—SHEET 6.

Witnesses:
H. B. Davis.
Cynthia Doyle.

Inventor:
Albert F. Jones,
by Noyes & Harriman
Attys.

A. F. JONES.
COUNTER FORMING MACHINE.
APPLICATION FILED MAY 26, 1909.
1,014,226.
Patented Jan. 9, 1912.
8 SHEETS—SHEET 7.
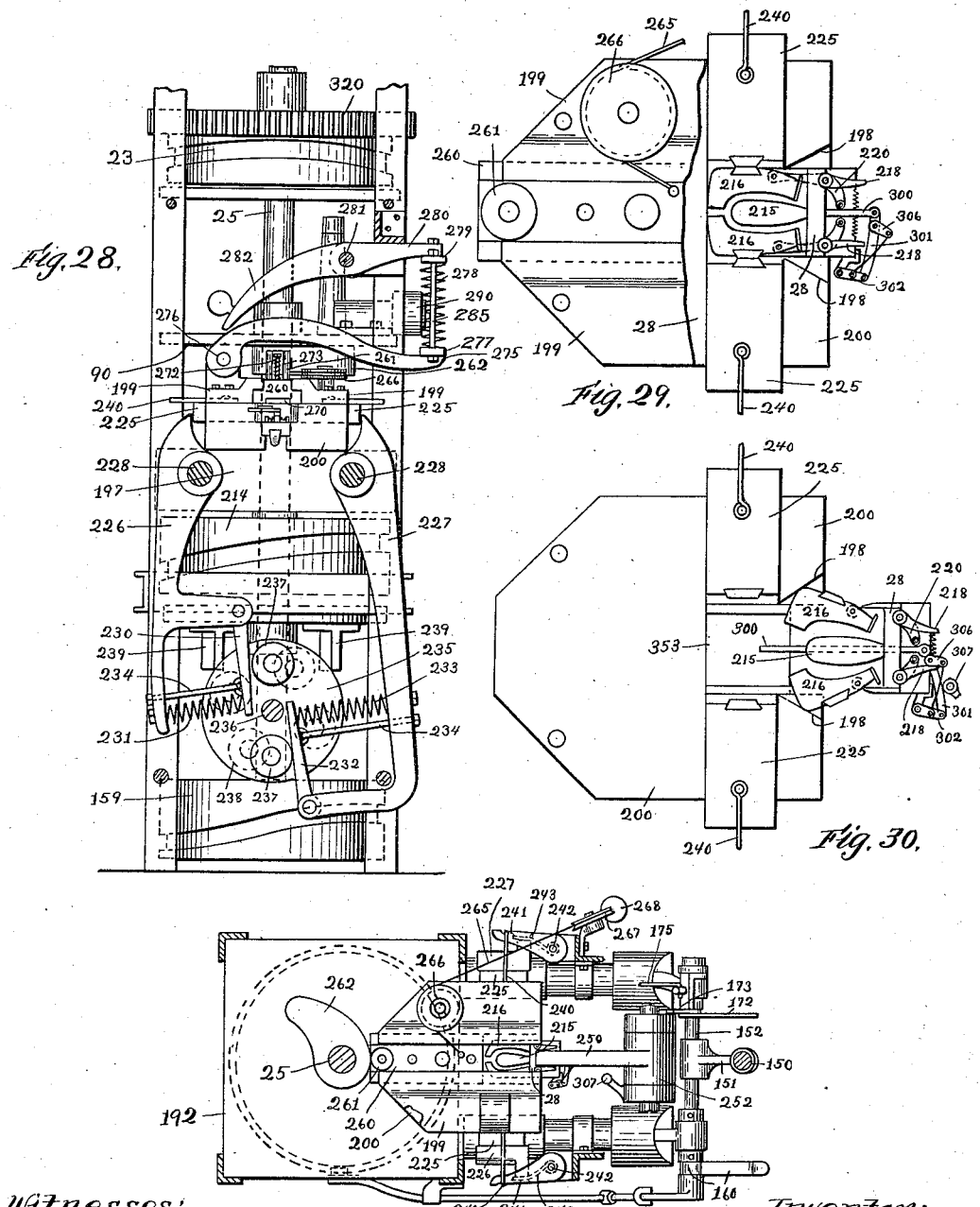
Witnesses:
H. B. Davis
Cynthia Doyle
Inventor:
Albert F. Jones
by Noyes & Hanniman
Attys.

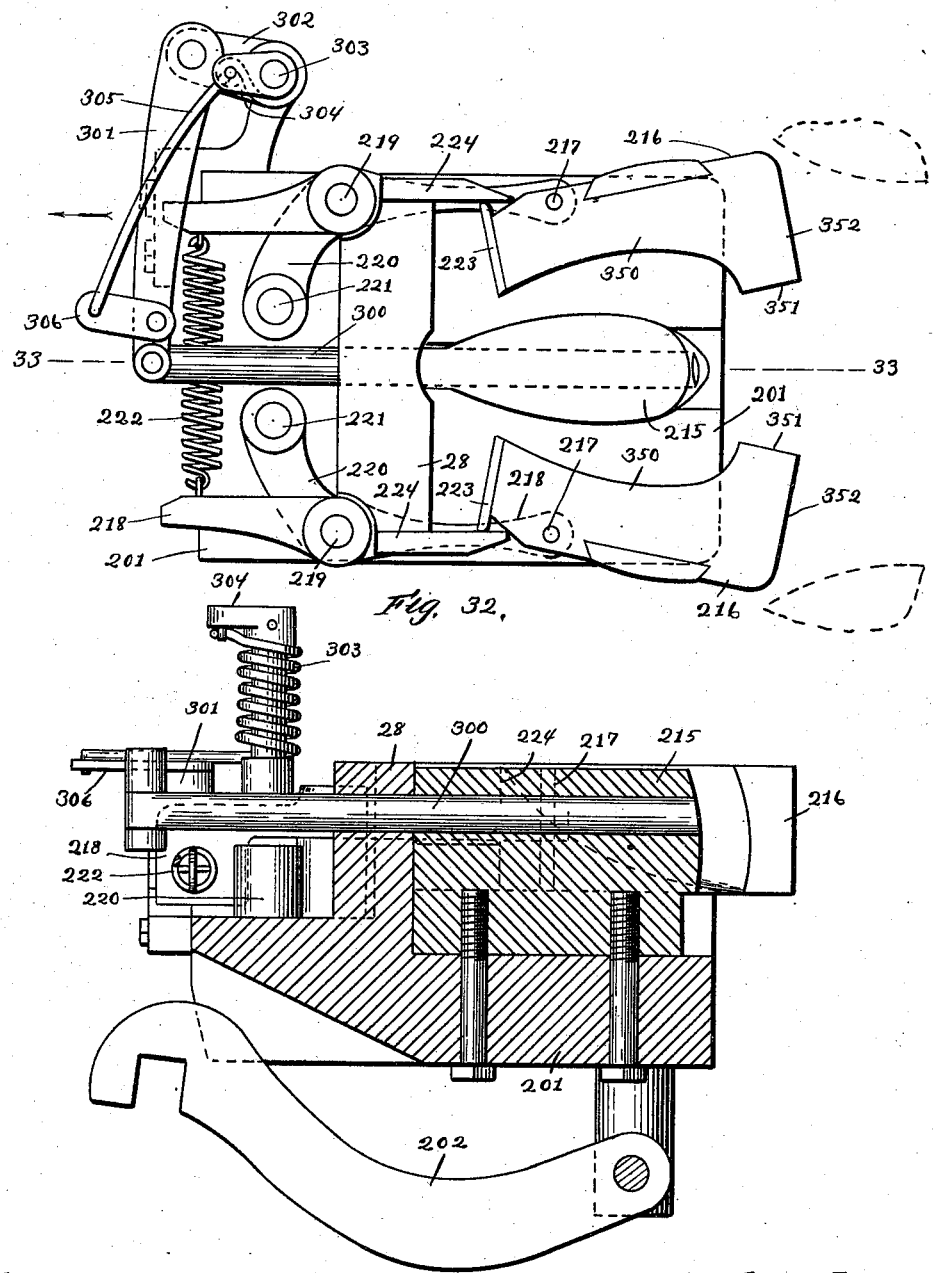

UNITED STATES PATENT OFFICE.

ALBERT F. JONES, OF SALEM, MASSACHUSETTS.

COUNTER-FORMING MACHINE.

1,014,226.   Specification of Letters Patent.   Patented Jan. 9, 1912.

Continuation of application Serial No. 359,202, filed February 25, 1907. This application filed May 26, 1909. Serial No. 498,411.

*To all whom it may concern:*

Be it known that I, ALBERT F. JONES, of Salem, county of Essex, State of Massachusetts, have invented an Improvement in Counter-Forming Machines, of which the following is a specification.

The present application is a continuation of my former application #359,202, filed February 25, 1907, which has been abandoned in favor of this application.

The invention relates to counter-forming machines.

In the counter-forming machine embodying the several features of my invention, a flat blank is first curved transversely, from end to end, in the direction of its length; the curved blank is then bent into heel-form, and is then compressed, and a flange is turned in on one edge of the blank which is also compressed.

The invention has for its object to provide a machine for forming counters with a feeding-device for feeding forward flat blanks and to provide improved means for automatically delivering flat blanks to the feeding-device; also to provide means for curving a blank transversely from end to end in the direction of its length, and a transferring-device for transferring the curved blank to suitable means by which it is bent into heel-form and presented to the compressing-device; also to provide means for reversing the transferring-device, whereby the position of the blank is reversed in transit; also to provide a bending-device by which the blank is bent into heel-form, and means for moving said bending-device to deliver the bent blanks to the compressing-device; also to provide means for holding the blank and for presenting it edgewise to the bending-device, whereby it may be accurately engaged by said device to be delivered to the compressing-device; also to provide a feeding-and-bending device for the blank and means for operating it to bend the blanks into heel-form and means for moving it to deliver the bent blanks to the compressing-device; also to provide a feeding-and-bending device constructed and arranged to take blanks curved transversely from end to end and bend them into heel-form and deliver them to the compressing-device; also to provide a feeding-and-bending device adapted to engage the edge of a blank and bend the blank into heel-form and deliver it to the compressing-device and hold it while the compressing-device operates; also to provide a movable compressing-device, and means for moving it, and a feeding-and-bending device for bending the blank into heel-form and for delivering the bent blank to the compressing-device, which is adapted to be moved by and with said compressing-device as the compressing-jaws are operated to compress the blank on the former; also to provide a feeding-and-bending device comprising two pairs of blank-engaging nippers movable on their axes, respectively, in opposite directions, and pivoted supports for said nippers, and means for operating said nippers and for moving said supports to engage the blank and bend it into heel-form, and means for moving said feeding-and-bending device to deliver the bent blank to the compressing-device; also to provide yielding supports for the blank-engaging nippers permitting movement thereof toward each other by the operation of the compressing device while engaging the blank which is held by said nippers; also to provide a feeding-and-bending device adapted to engage the edge of a blank, and means for operating it to bend the blank into heel-form, and means for moving it to deliver the bent blank to the compressing-mechanism and for holding it while the compressing-mechanism operates; also to provide compressing-mechanism adapted to engage the middle of the blank and compress it from the middle toward its ends; also to provide a former and a pair of compressing-jaws and supports for said jaws permitting movement thereof toward the former, and also a rocking movement thereof whereby they may engage the blank at the middle and compress it from the middle toward its ends; also to provide a former and a pair of compressing-jaws, and means for moving the outer ends of said jaws into engagement with each other to form a molding-face at the outer end of the former and for then moving the inner ends of said jaws toward the former to compress the blank from the middle toward its ends; also to provide a former and a pair of compressing-jaws, movable one with relation to the other, and means for moving the outer ends of said jaws into engagement with each other to form a molding-face at the outer end of the former and for moving the inner ends of said jaws toward the former to compress the blank from the middle toward its ends; also to provide a jaw-engaging end wall, a jaw-carrier and former thereon, and compressing-jaws thereon, means for moving said jaw-carrier toward and from said end wall to move the compressing-jaws against the end wall to restrain their longitudinal movement while the former continues to advance; also to provide a pair of jaw-engaging side walls and a jaw-engaging end wall, a jaw-carrier and former thereon, compressing-jaws thereon, means for moving said jaw-carrier and means for operating said compressing-jaws; also to provide a sliding jaw-carrier and former thereon, and a pair of compressing-jaws thereon, movable transversely with respect to the former, and restrained from longitudinal movement while the former advances, means for moving said jaw-carrier and means for operating said jaws; also to provide a counter-forming mold with a flange-forming and flat-pressing device, for turning in a flange on top of the mold and for flat-pressing it; also to provide the former of the counter-forming mold with a discharging-device for discharging the counter by an endwise movement with respect to the former; also to provide the former of a counter-forming mold with a recess and a discharging-device contained in said recess, the exposed end or portion of which is normally disposed flush with the molding-face of the former and is shaped or fashioned to correspond to the contour of said molding-face.

Figure 2:
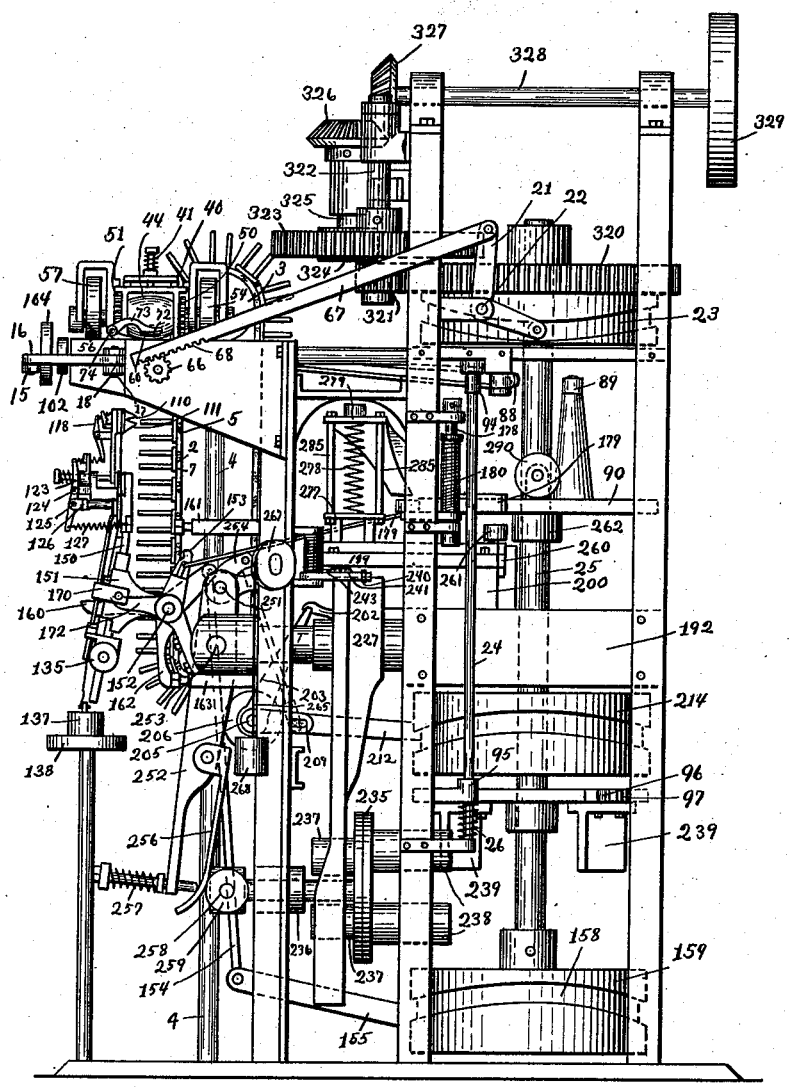
Figure 27:
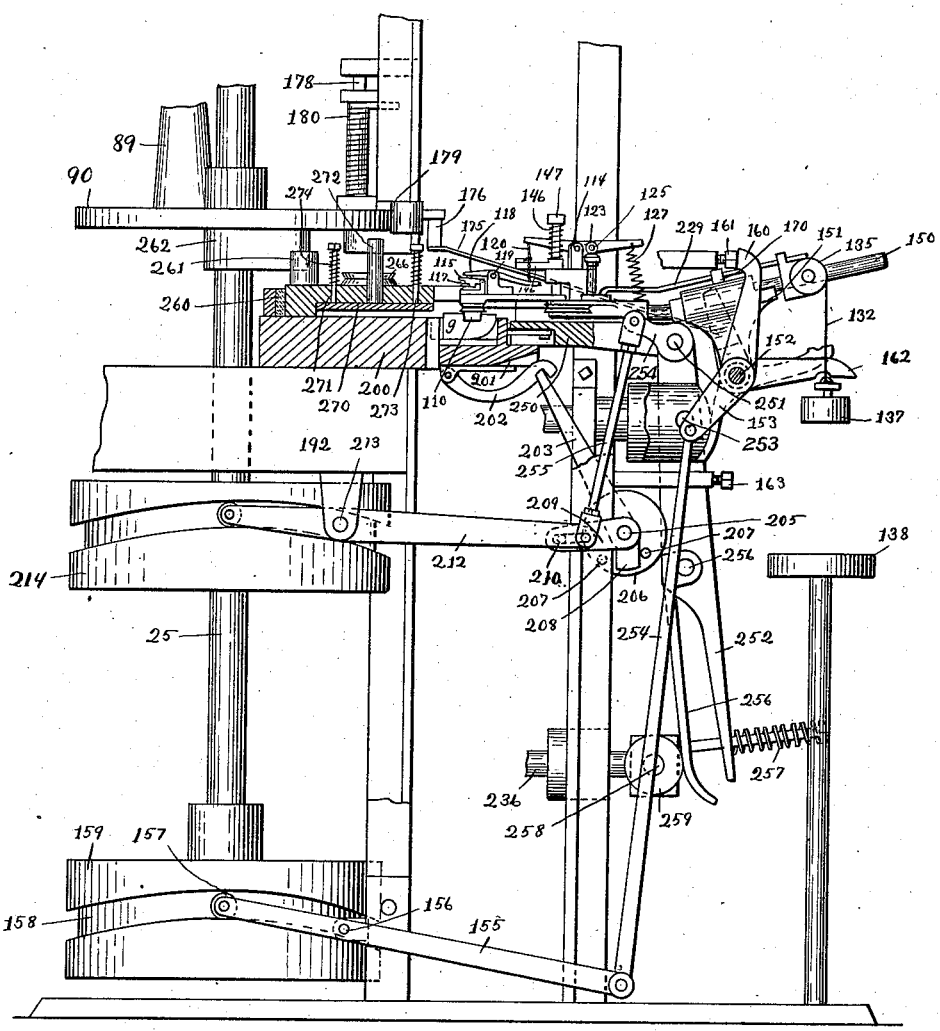

Figure 1 shows in front elevation a counter-forming machine embodying this invention. Fig. 2 is a right hand side elevation of the machine shown in Fig. 1. Fig. 3 is a detail of a portion of a blank-carrier which may be employed. Fig. 4 is a detail showing the means for discharging the blanks from the blank-carrier. Fig. 5 is a vertical section of a curving-device for the blank which may be employed, by which a flat blank is curved from end to end in the direction of its length, and also a vertical section of the transferring-device, taken on the dotted line 5—5, Fig. 6. Fig. 6 is a plan view of the curving-device and transferring-device. Fig. 7 is an end view of the curving-device. Fig. 8 is a vertical section of the curving-device, taken on the dotted line 8—8, Fig. 5. Fig. 9 is a vertical section of a portion of the transferring-device, taken on the dotted line 9—9, Fig. 6. Fig. 10 is an end view of the transferring-device. Fig. 11 is a plan view of the flat blank. Fig. 12 is a vertical section of the flat blank shown in Fig. 11. Fig. 13 is a plan view of the blank, curved from end to end in the direction of its length. Fig. 14 is a vertical section of the curved blank shown in Fig. 13. Figs. 15, 16, 17, 18, 19 and 20 are details of the operating means for the transferring-device to be referred to. Fig. 21 is a front elevation of the feeding-and-bending device. Fig. 22 is a side elevation of the feeding-and-bending device shown in Fig. 21. Figs. 23, 24, 25, and 26 are details of the feeding-and-bending device to be referred to. Fig. 27 is a vertical section of a part of the machine, showing particularly the feeding-and-bending device and means for operating it and the compressing and flanging mechanism. Fig. 28 is a side elevation of a portion of the machine, showing particularly the compressing and flanging-mechanism. Figs. 29, 30 and 31 are details, in plan view, of the compressing and flanging-mechanism. Fig. 32 is a plan view of the compressing-mechanism. Fig. 33 is a vertical section of the compressing mechanism shown in Fig. 32, taken on the dotted line 33—33.

The flat blanks 1, see Fig. 11, which are to be formed into counters, are automatically delivered to a feeding-device, by which they are fed to a curving-device to be described, to be curved transversely in the direction of their length, from end to end. For the purpose of thus automatically delivering the blanks to the feeding-device I provide an endless chain 2, see Figs. 1, 2 and 3, which is made as a sprocket-chain, which passes around two sprocket-wheels 3, supported one above the other in suitable bearings. The uppermost sprocket-wheel 3 is secured to a shaft 10, having its bearings in an upright frame 4, and bearing a belt-pulley 11, and the lowermost sprocket-wheel 3 is secured to a shaft also having its bearings in said frame 4. The chain 2 has secured to it a series of plates 5, which are disposed transversely with respect thereto and which are located at regular distances apart, and each plate has projecting from its outer face two pairs of pins 6—7 and 8—9, arranged one above the other, and occupying horizontal planes, to provide between them a horizontal space to receive a blank, which, when placed therein by hand, rests upon the lowermost pair of pins 6—7. Each plate 5 and pins thereon, therefore, serves as a single blank-holder, and the several plates and chain bearing them form a blank-carrier.

The blank-holders herein shown are open at one side and both ends, and provide for receiving the blanks at the open side thereof, the blanks being placed therein by a sidewise movement, and for discharging the blanks at one end thereof, the blanks being discharged by an endwise movement. The blanks are placed in the blank-holders at one side of the chain, and as the chain is moved in an upward direction, they will be brought successively into position to be delivered to the feeding-device, which is herein shown as a pair of feed-rolls 30, 31, see Fig. 5, the blanks at such time occupying a position directly opposite the bite of said rolls.

The flat blank, when brought into position to be delivered to the feed-rolls 30, 31, is engaged by a swinging arm 12, see Figs. 1 and 4, secured to a pivot-shaft 13, having its bearing in an arm 20 on the frame 4. To said shaft 13 is secured an arm 14, which is connected by a link 15, with one arm, as 16, of a bell-crank lever, pivoted at 17, the other arm 18 of which is adapted to be struck by the end of a bar 67 which is adapted to be reciprocated longitudinally. When the bar 67, herein shown as a rack-bar, strikes the arm 18, the arm 12 is moved to engage the blank at one end, and to move it by an endwise movement into engagement with the feed-rolls 30, 31. A spring 19 is connected to the arm 14, which acts to return the arm 12 when the rack-bar 67 retreats, preparatory to engaging the next blank, which is subsequently brought into position to be engaged by it by the blank-carrier. The blank-carrier thus described is endless and is moved continuously to convey the blanks to a position opposite the feeding-device, and the arm 12 is reciprocated to successively move the blanks into engagement with the feeding-device. The means herein shown for automatically delivering the flat blanks to the feeding-device is simple, but I do not desire to limit my invention to the employment of this particular means. The flat blanks 1, thus delivered to the feed-rolls 30, 31 are fed by said feed-rolls to a curving-device, by means of which they are curved transversely from end to end, or concaved, in the direction of and throughout their length.

The lower feed-roll 31, see Fig. 5, is represented as an idle-roll, the journals of which are supported in the side walls of a frame, and said roll is, or may be, employed as a means of applying wax or other sizing to one side of the blanks. As herein shown, a wax-receptacle 32 is arranged beneath the roll 31, having a movable bottom-plate 33, upon which a cake of wax may be placed. The bottom-plate is lifted by a weight 35, attached to a cord 36, which passes over a pulley 37, and is connected to a pin 38, extended laterally from the bottom-plate through a slot in the side wall of the receptacle; and the wax, which is placed on said plate, is thereby raised and held in continuous engagement with the roll 31. In case it is not required to apply wax or other material to the blank, the roll 31 will serve merely as the lower feed-roll.

The upper feed-roll 30, is journaled in boxes provided in the side-walls of the frame, and to one of the journals thereof a gear-wheel 39, is secured, see Figs. 6 and 7. It is desired that the feed-roll 30 shall yield, and to this end a yoke 40, is located above it, the arms of which are arranged to bear upon the journal-boxes of the roll, and said yoke has a hole through it for an upright pin 41, rising from the frame, upon the upper end of which a nut 42 is placed, and a spring 43 is interposed between said nut and yoke, which acts to press the yoke down upon the journal-boxes.

The curving-device for the blank consists of a plurality of convex-rolls 44, 45 and 46, made alike, or substantially so, and arranged in parallelism and so as to turn on horizontal axes. These convex-rolls are made independently yielding, like the feed-roll 30, a spring-pressed yoke 47, like the yoke 40, being provided for each roll, which is adapted to bear upon the journal-boxes thereof. The convex-rolls are located above a bed-plate 48, which is arranged in line with the bite of the feed-rolls or thereabout, and the upper side of said bed-plate is concaved in the direction of its length, the concavity therein corresponding to the convexity of the rolls 44, 45 and 46, so that as the blanks pass along between said rolls and the bed-plate, they will be curved transversely in the direction of their length. The convex-rolls 44, 45 and 46 are positively driven in the same direction to enable them to feed along the blanks, and, as herein shown, one of the journals of each roll has secured to it a gear-wheel, said gear-wheels being represented in Fig. 6, by dotted lines, at 49, 50 and 51. A pinion 52 secured to a shaft 53, bearing a belt-pulley 54, is located between and engages the gear-wheels 50 and 39, and a pinion 55, secured to a shaft 56, bearing a belt-pulley 57, is located between and engages the gear-wheels 49 and 51. By this means the three convex-rolls and the feed-roll 30 are positively driven in the same direction, and the blanks are fed along and curved transversely from end to end, in the direction of their length, but I do not desire to limit my invention to the particular construction of curving-device herein shown, as it is obvious that a curving-device having the same capabilities, and also, if desired, adapted to apply wax or other suitable material to the blanks, may be differently constructed, and yet embody the principle of my invention and come within its spirit and scope.

The transversely curved blank passes from the curving-device to a transferring-device, see Figs. 5, 6, 9 and 10, by which it is delivered to a feeding-and-bending device, to be described. The transferring-device, now to be described, is constructed and arranged to receive the transversely curved blank from the curving-device, and to reverse its position so that its convexed face will be uppermost, and to deliver it, in such position, to the feeding-and-bending device.

The transferring-device consists essentially of an oscillating, reversible clamp, which is arranged to receive the curved blank and hold it firmly while carrying it to the feeding-and-bending device, and to reverse its position, in transit. The under member of the clamp consists of a rectangular or other shaped plate 60, concaved from end to end to correspond to the curvature of the blank, and secured to the upper ends of a plurality of arms 61, three being herein shown, which are formed or provided with screw-threaded extensions 62, which pass through transverse holes in an oscillating-shaft 64, supported by suitable bearings. On the screw-threaded ends of said extensions 62, nuts 65 are placed, at opposite sides of the shaft 64, which provide for adjustment of the plate 60, to different elevations, thereby enabling it to be disposed flush with the stationary concaved plate 48. The shaft 64 has secured to it a pinion 66, which is engaged by the rack-bar 67, adapted to be reciprocated by suitable means for the purpose of oscillating the shaft 64. The rack-bar 67 is pivotally connected to the extremity of one arm of a bell-crank-lever 21, pivoted at 22 to the main frame, the other arm of said lever having a stud, with or without a roll thereon, which enters a cam-groove formed in a disk 23, secured to the main upright shaft 25. Rotation of said disk operates to reciprocate the rack-bar and thereby turn the pinion 66 to oscillate the shaft 64. At one side or edge of the plate 60, an edge-guide 68 is provided, consisting of an angularly formed strip comprising a base-portion and an upturned lip, the latter serving essentially as the edge-guide, and said strip 68 is secured to the outer ends of a plurality of arms 69, three in number, secured to a pivot-rod 70, having its bearings in the arms 61, and to said pivot-rod weighted arms 71 are secured which extend in the opposite direction from the arms 69, which operate by gravity to control the position of the arms 69 and edge-guide supported by it, as will be described.

When the clamp is in its normal position, as shown in Figs. 5 and 6, and full lines Fig. 10, it is so disposed relative to the curving-device as to receive the blank therefrom and the edge-guide 68 is held in its elevated position, at the side of the plate 60, the base of the edge-guide forming an extension of said plate 60; and as the blank is delivered upon the plate 60, the edge thereof extending over upon the edge-guide. When the position of the clamp is reversed, as it will be when delivering the blank to the feeding-and-bending device, as shown by dotted lines Fig. 10, the weighted-arms 71 falling by gravity will operate to lift the edge-guide away from the plate 60, thereby exposing or uncovering the edge of the blank, leaving the blank with its edge projecting from the plate 60 far enough to be grasped by the nippers of the feeding-and-bending device, to be described. As the clamp returns to its normal position, the weighted-arms will act to restore the edge-guide.

The upper member of the clamp consists of a plate 72, secured to the extremities of a plurality of arms 73, three in number, secured to a pivot-shaft 74, having its bearings in the arms 61, and the engaging-face of said plate 72 is curved to correspond to the curvature of the plate 60 and the blank which is adapted to be engaged by it. An arm 75 is secured to the pivot-shaft 74, to the lower end of which a link 76 is pivotally connected, the opposite end of said link being pivotally connected to an arm 77, secured to a pivot-shaft 78, having its bearings at the extremities of a pair of arms, 79, which are secured to the oscillating-shaft 64, and a spring 80 encircles said pivot-shaft 78, one end of which is attached to the shaft and the other end to the frame, which acts to turn said shaft in one direction. The spring 80, when permitted to act, turns the shaft 78, and moves the arm 77, and link connected with it and arm 75 connected with said link to turn the pivot-shaft 74, and move the upper clamping-member 72 into engagement with the blank upon the plate 60, and thereby hold said blank firmly, but with a yielding pressure. The upper clamping-member 72 is raised for the introduction and delivery of the blank against the action of the spring 80, and to accomplish this result an arm 81 is secured to the pivot-shaft 74, which extends beneath the plate 60, and preferably has a friction roll at its extremity, and a dog 82 is mounted frictionally on the oscillating-shaft 64, so as to be turned independently thereon, which is arranged to operate the arm 81, and thereby lift the upper clamping-plate, or to permit said plate to be depressed by the spring 80.

A hub 83 on the dog 82 extends laterally and has projecting from it radially two pins 84, 85, see Figs. 5, 6 and 15 to 20. A bell-crank lever 86, is pivoted to an ear on the frame and one arm thereof is adapted to be moved into the path of movement of the pin 84 for the purpose of arresting the movement of the dog. The other arm of said bell-crank lever 86 is connected by a link 87, with a pivoted arm 88, with or without a roll at its extremity, which is adapted to be struck by a roll or stud 89, secured to the upper side of a revolving disk 90, which is secured to the upright-shaft 25, to thereby move the bell-crank lever into position to engage the pin 84, and when said arm 88 is disengaged it is returned by a spring 91, and the bell-crank lever thereby moved out of position to engage the pin.

A pivot hook 92 is provided for engaging the pin 85, for the purpose of advancing the dog on the shaft, and said hook is connected by a link 93 with an arm 94, secured to a pivot-shaft 24 to which an arm 95 is secured, with or without a roll thereon, adapted to be engaged by a projection 96, on a revolving disk 97, which is secured to the upright-shaft 25. A spring 26 encircles said pivot-shaft 24, one end of which is connected to the shaft and the other end to the frame, the action of which is to return the pivot-shaft when the projection 96 passes by the arm 95. The oscillating-shaft 64 has secured to it a collar 98, from which an arm 99 extends over the hub 83, which is adapted to engage the pin 84, and move the dog 82 at a certain part of the oscillation of the shaft.

Between the curving-device and the transferring-device, and also beneath the under-plate 60 of the clamping-device, feed-rolls 100 are provided, which are herein shown as concaved-rolls, secured to shafts or axles 101 having their bearings in the frame, and each shaft 100 has a pinion 102 secured to it, and between said pinions, intermediate pinions 103 are placed, so that all of said pinions 102 will revolve in the same direction, and to one of the shafts 101, a belt pulley 104 is secured. The underplate 60 of the clamping-device has holes through it, see Fig. 9, up through which the feed-rolls 100 slightly project in order that they may engage and feed along the blank. Said feed-rolls act to feed the blanks into position to be engaged by the clamping-device.

Figure 15:
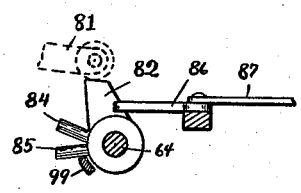
Figure 16:
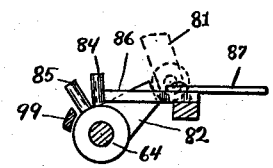
Figure 17:
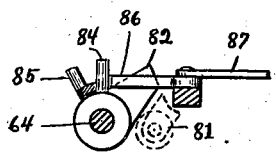
Figure 18:
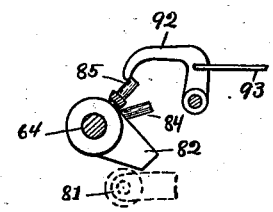
Figure 19:
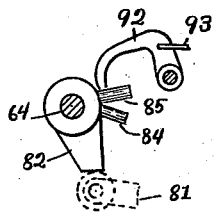
Figure 20:
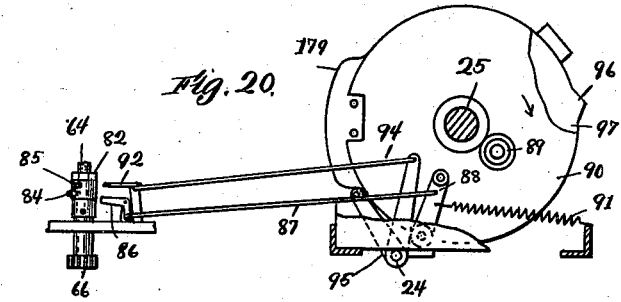
Figure 26:
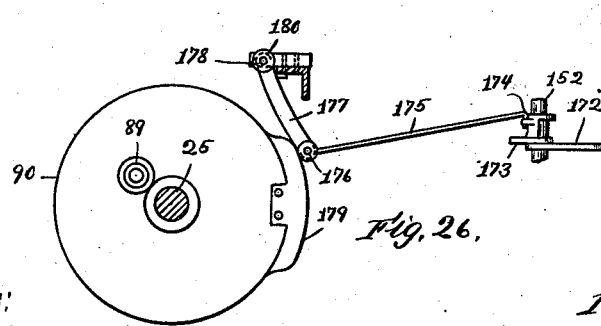

The operation of the transferring-device is as follows:—Normally plate 60 occupies a position in alinement with the travel of the blank through the curving-device, and the clamping means are supported as shown in Figs. 5, 6, 10 and 15, and the arm 81 rests on the dog 82, see Figs. 10 and 15. The blank having been delivered to the transferring-device, the shaft 64 begins its oscillation, carrying the clamping-device with it, and by the pressure of the arm 81 on dog 82, said dog is caused to turn with the shaft 64. Very soon, however, the pin 84 on the dog strikes the bell-crank lever 86, see Fig. 16, and is arrested, and the arm 81 then rides over the dog, and the upper clamping-plate 72 is thereby released and is moved into engagement with the blank on the plate 60 by the spring 80, thereby firmly holding the blank. Then the arm 99, which is moving with the shaft 64 approaches the dog and engages it, see Fig. 17, after the bell-crank lever disengages it, and carries the dog around with the shaft until it arrives in the position shown in Fig. 18. Then the hook 92 is operated to engage the pin 85 and to quickly advance the dog with respect to the shaft, as shown in Fig. 19, thereby moving it into position to again engage the arm 81, and move the clamping-plate 72 away from the plate 60 to disengage the blank. As soon as the clamp is reversed the weighted arm 71 falls by gravity and lifts the edge-guide. Thus it will be seen that the blank is carried from the curving-device to the feeding-and-bending device, and the position of the blank is reversed, and the edge of the blank is caused to project from the transferring-device far enough to be easily engaged by the nippers of the feeding-and-bending device. My invention, however, comprehends any other suitable means for delivering the blank edgewise to the feeding-and-bending device, so that it may be accurately presented to said device, to be engaged by it, and subsequently delivered to the compressing-device. The blank is then removed by the feeding-and-bending device and the transferring-device is returned to its normal position to repeat the operation. During the entire return movement of the transferring-device, the arm 81 remains in engagement with the dog 82, as the pressure of the arm thereupon holds the dog and causes it to return to its normal position with the shaft. It will be observed that as the shaft 64 turns in one direction the clamping-device, which is normally open, first closes upon the blank and remains closed upon the blank for a period of time while the clamping-device is being moved and finally opens and disengages the blank; and as the shaft turns in the opposite direction the clamping-device remains open all the time.

The feeding-and-bending device which will now be described, see Figs. 2 and 21 to 25, is designed to take the blank from the transferring-device, which has been curved from end to end in the direction of its length, and to deliver it to the compressing and flanging-mechanism, and to bend it, in transit, to conform it to the general shape of a heel.

The feeding-and-bending device consists essentially of two pairs of nippers adapted to engage the edge of the blank at points near the opposite ends, and means for turning said nippers on their axes and for moving them toward each other, for the purpose of bending the blank, and also means for moving the nippers from the position which they occupy when engaging the blank to a position to deliver it to the compressing and flanging-mechanism.

110, 111 represent one of the pairs of nippers, the other pair being made substantially like it. The nipper-member 110 has a cylindrical body 112, fitting a circular hole formed at the upper end of an arm 113 thereby adapting it to be turned on its axis, and said arm 113 is pivoted at its lower end to a frame 150, thereby adapting it to move bodily the nipper-member. Said cylindrical body 112 is slotted longitudinally to provide a space for the nipper-member 111, which is contained therein, and which is pivoted to said body. The nipper-member 110 serves as the stationary-member and the nipper-member 111 as the movable-member of the pair of nippers. The nipper-member 111 has a shank 114, extended through the slot in the body 112 and beyond said body, which enters a recess formed in a plate 115, pivoted at 116, to a bracket 130, which is secured to the exposed end of the cylindrical body 112, said plate moving on its pivot to move the nipper-member 111 toward and from the nipper-member 110. The plate 115 is moved in one direction by a spring 117 to open the nipper-member 111, and is moved in the opposite direction by a lever 118 to close the nipper-member. The lever 118 is pivoted at 119, and one end of said lever bears a stud which engages the plate 115, at a point in line with the axis of the nippers and the other end has attached to it a chain 120, which is connected to one end of a plate 121. The other pair of nippers is likewise supported by an arm 113, pivoted to the frame 150, and is provided with a pivoted plate 115 and an actuating-lever 118, which latter has attached to it a chain 120, which is connected to the opposite end of said plate 121. A chain 122 is connected to said plate 121, at or near the middle, which is connected to the upper end of a lever 123, pivoted at 124, and having at a point intermediate its length a laterally extended stud 125, with or without a roll thereon, which is engaged by a cam 126. The lever 123 has attached to its lower end a spring 127, which is connected to the frame 150. The action of the spring 127 is to move the lever 123 on its pivot and cause it to pull upon the chains 122, 120, 120, and thereby move the levers 118 on their pivots, causing them to positively move the plates 115, and thereby move the nipper-members 111 toward the nipper-members 110. The nippers are therefore closed by a yielding pressure when the spring 127 is permitted to act. Closing the nippers by spring-pressure provides for engaging blanks of different thicknesses and for holding them securely.

The cam 126 is formed on the end of a pivot-shaft having its bearings in the frame 150, and to said shaft a short arm 128 is secured to which a rod 129 is connected, adapted to be moved longitudinally to turn the pivot-shaft and thereby operate the cam. When the cam is in one position the spring 127 is permitted to act to close both pairs of nippers, and when the cam is moved into its other position the lever 123 will be positively moved by it and the springs 117 permitted to act to open both pairs of nippers.

Each pair of nippers has an arm 131 extended laterally from its cylindrical body, the arms of the two pairs of nippers being extended in opposite ways, and to the extremities of said arms straps or cords 132 are attached, which pass downward over separate idle pulleys 133 journaled to the frame 150, and thence through guide-eyes 134, and thence over separate pulleys 135 journaled at the lower end of said frame 150, and their lower ends are attached to a cross-bar 136, to which is connected a weight 137, which, when the frame 150 is in one position, rests upon a fixed-support 138. A pulling or drawing movement of the straps 132, incident to lifting the weight, acts to draw down the arms 131, causing them to turn both pairs of nippers on their axes, but in opposite directions.

In addition to turning the nippers on their axes it is necessary to move them bodily toward each other, see Fig. 23, for the purpose of bending the blank transversely, and this is accomplished by moving the arms 113 bearing the nippers on their pivots in a direction toward each other. The nippers have short arms 140 extended laterally from their cylindrical bodies in a direction opposite the arms 131, and said arms 140 of both pairs of nippers are connected together by a link 141, which is formed or provided with longitudinal slots at its ends, to receive pins 142, extended laterally from said arms 140. This link 141 connects the nippers together. The pivot-shaft 143 of one of the arms 113, has a short arm 144 loosely mounted upon it, which is loosely connected by a link 145 to a similar arm 146, which is rigidly secured to the pivot-shaft of the other arm 113, thereby connecting the two arms 113, 113 together, and the pivot-shaft 143, bearing the loose arm 144 is extended and has mounted upon it a spring 147, one end of which is connected to the pivot-shaft and the other end to the loose arm 144. This spring acts to turn the two pivot-shafts in opposite ways to thereby move the arms away from each other, and such movement of the arms is limited by the pins 142 engaging the outer ends of the slots in the link 141. When the straps 132 are drawn down and the arms 131, 131, also drawn down to turn the nippers on their axes in opposite ways the arms 140, 140, are raised, and the link 141 is also raised, and as the link rises above the plane of the nippers the arms 113, 113, will be moved toward each other until the nippers have been moved into the position shown in Fig. 23, and during this turning movement of the nippers and the bodily movement thereof toward each other, the blank will be bent into heel-form. As the arms 113, 113, are thus moved toward each other the spring 147 yields, but still tends to separate the arms, so that the pins occupy their normal positions at the outer ends of the slots in the link. The spring 147, however, permits said arms 113 to be moved toward each other and the pins to be moved along in the slots in the link to provide for a bodily yielding movement of the nippers in a direction toward each other which is required when disengaging the blank from the nippers by the action of the coöperative parts of the compressing-mechanism, said nippers thereby adjusting themselves to the compressing-mechanism, as will be hereinafter described. When the strain upon the straps is relieved the spring 147 is permitted to act to restore the nippers, turning the pivot-shaft 143 backward and moving the arms 113, 113, away from each other, until the parts have resumed the position shown in Fig. 21.

The frame is slidably connected to an arm 151, which is secured to an oscillating-shaft 152, and as said shaft oscillates said frame bearing the nippers is moved one-quarter of a revolution or thereabout from the upright position shown in Fig. 22, to the horizontal position shown in Fig. 27, to carry the blank from the position in which it is received from the transferring-device to a position to deliver it to the compressing and flanging-mechanism. The blank when delivered to the nippers occupies a horizontal plane, and when delivered to the compressing and flanging-mechanism occupies a vertical plane.

For the purpose of oscillating the shaft 152 an arm 153 is secured to it, which is connected by a rod 154 to one end of a lever 155, pivoted at 156 to the main-frame, the other end of said lever having a stud 157, with or without a roll thereon, which enters a cam-groove 158, formed in a disk 159, secured to the main upright-shaft 25. An arm 160 is also secured to said oscillating-shaft 152, which is adapted to strike a stop 161, to limit the movement of the shaft in one direction, and another arm 162 is also secured to said oscillating-shaft which is adapted to strike a stop 163 to limit the movement of the shaft in the opposite direction.

As the opening and closing of the nippers is controlled by a movement of the rod 129, means are provided for operating said rod so as to close the nippers on the blank when in position to receive the blank from the transferring-device and then to retain the nippers closed while the shaft 152 oscillates and carries the blank to a position to be delivered to the compressing and flanging-mechanism, and then to open the nippers to disengage the blank, and to retain the nippers open during a return movement of the shaft preparatory to again closing them upon the next blank which is delivered to them. To accomplish this result the rod 129 has secured to it a block 170 bearing a pin 171, which is extended laterally from it. An arm 172 is mounted loosely on the shaft 152, which is made long enough to extend beneath the pin 171, or to obstruct its path of progress, and when the frame 150 is moved into its upright position, Fig. 22, said arm will engage said pin and lift the rod 129 a short distance, far enough to operate the cam 126. Another arm 173 is also mounted loosely on the shaft 152, which may be rigidly connected to the arm 172, and said arm 173 is made long enough to extend beyond the pin 171, or to obstruct its path of progress, and when the frame 150 is moved into its horizontal position Fig. 27, will engage said pin and move the rod 129 a short distance in the opposite way, far enough to again operate the cam 126. These two rigidly connecting arms require but a short movement of their own to move the rod 129, and, as herein shown, a pin 174 projects from the sleeve or frame connecting the two arms 172, 173, to which one end of a rod 175 is connected, the opposite end of said rod being connected to a pin 176 projecting downward from the extremity of an arm 177 secured to an upright pivot-shaft 178, having its bearings in the main-frame. The pivoted-arm 177 has a stud, with or without a roll thereon, which engages the edge of the cam-disk 90, secured to the main upright-shaft 25, and said arm is held in engagement with said cam-disk by a spring 180 encircling its pivot shaft and connected thereto, and is moved by the projection 179, on said disk. The cam-disk is timed to move the arm 177 and operate the arms 173, 172, at the required moments to move the rod 129, and operate the cam, to open and close the nippers at the proper times. The movement of the arms 172, 173, is, therefore, independent of the shaft 152.

As the shaft 152 is oscillated the frame bearing the nippers will be moved from the upright to the horizontal position, and when so moved the weight 136 will be lifted from the rest 138, and the straps or cords drawn down to turn the nippers on their axes and also to move the nippers toward each other, to thereby bend the blank, and as the arms 172, 173, are moved the nippers will be opened and closed at the proper times to engage and release the blank.

The compressing-mechanism and flanging-mechanism for the blank will now be described, see Figs. 1, 2 and 27 to 33.

200 represents a block which is stationarily supported in horizontal position on a block 192 on the main frame. Said block 200 is cut away at one end to provide a rectangular vertical passage through it from top to bottom, said passage extending inward nearly to the middle of the block. On top of said block a pair of plates 199 are secured, which extend from end to end of the block, at opposite sides of said passage, a space being provided between them, approximately equal to the width of the passage, and said plates are undercut at their adjacent sides to form guide-ways for the flanging-device to be described. The opposite sides of the vertical passage through the block are formed with guide-ways in which slides a jaw-carrier 201. The jaw-carrier consists essentially of a rectangular plate having a transverse rib 28 upon its upper side. The jaw-carrier is disposed horizontally and is movable in and out in the guide-way provided for it in the vertical passage in the block 200, and when in its outermost position, see Fig. 30, a hole is presented through the block, through which the completed counters are finally discharged, as will be described. A link 202 is pivotally connected to the under side of the jaw-carrier 201, see Fig. 33, which engages the extremity of an arm 203, see Fig. 27, secured to a sleeve 204, mounted loosely on a shaft 205, having its bearings in the main-frame. A disk 206 is secured to said sleeve 204, which has projecting laterally from one side of it two pins 207, located a short distance apart, and a short arm 208 is secured to the shaft 205, which occupies a position between said pins 207. Another arm 209 is secured to said shaft 205, which is slotted to receive a pin 210, extended laterally from one end of a lever 212, pivoted at a point intermediate its length, as at 213, the opposite end of said lever being bent inward and having a stud, with or without a roll thereon, which enters a cam-groove formed in a disk 214, secured to the upright-shaft 25. As the disk 214 revolves the lever 212 is moved on its pivot and the shaft 205 rocked, and by means of the arm 208 thereon, the sleeve bearing the arm 203 is rocked, which acts to move the jaw-carrier 201 back and forth in the guide-way in the block 200. The distance between the pins 207 is greater than the width of the arm 208, which is located between them, to provide a little lost motion, so that the jaw-carrier 201 may be moved a short distance independently of the actuating-mechanism just described, for purposes to be explained.

The jaw-carrier 201 has secured to its upper side a former 215 upon which the blank is compressed to form the counter, the engaging-face of the former being curved to conform to the shape it is desired to give to the counter. At the opposite sides of the former the compressing-jaws 216, 216, are located, said jaws being arranged on the jaw-carrier. These jaws are similarly constructed but are arranged as opposites and are movable toward and from the former. The jaws are made of the same thickness as the acting or engaging portion of the former, and the tops of the jaws and the top of the former occupy the same plane.

Each jaw, as herein shown, has a side-engaging portion 350, a rocking-engaging face 351 adjacent its outer end and an abutting-wall 352 at its outer end, which adapts said jaws to be engaged by suitable means employed for moving them transversely or inwardly toward the former, and to engage each other at their outer ends, at the outer end of the former, to form a molding-face thereat, and to rock on their points of engagement while the inner ends are moved inwardly, and for engaging a fixed abutting-wall whereby they are held against longitudinal movement while the former continues to advance, so that the blank may be engaged at the middle and compressed from the middle toward its ends. As but two jaws are provided and as it is necessary to compress the end and both sides of the blank, said jaws are connected to suitable supports which permit them to be moved bodily inward toward the former, and the outer ends thereof to be moved into engagement with each other at the outer end of the former to form a molding-face thereat, and while they are held in engagement with each other, at their outer ends, to be held against longitudinal movement while the former continues to advance independently thereof, and while so held and the former is thus advancing, the inner ends thereof to be moved inward toward the former, such movement of the jaws and of the former enabling the blank to be engaged at its middle or heel-end and compressed from the middle toward its ends. Said supports also permit the jaws to be separated or moved away from the former when pressure upon them is released and such separation is sufficient to provide for the discharge of the molded counter by an endwise movement thereof with respect to the former. These supports will now be described.

Each compressing-jaw 216 is pivoted at 217 to one end of a lever 218, which is pivoted at a point intermediate its length, at 219, to the extremity of an arm 220, which is pivoted at 221 to the jaw-carrier, and the opposite end of said lever 218 has a spring connected to it. As herein shown, a spring 222 is employed which connects the outer ends of the two levers 218 together, which acts to draw said ends together. Movements of the levers 218 on their pivots, incident to the contraction of the spring, operate to move the compressing-jaws away from the former. The inner end of each compressing-jaw is or may be formed or provided with a projection 223, and said projections are adapted to engage projections 224, herein shown as stationarily disposed on the jaw-carrier, and said projections 224 serve as fulcrums for the compressing-jaws and provide for moving the levers 218 on their pivots as the compressing-jaws are moved inward.

To move the compressing-jaws inward toward the former the opposite sides of the vertical passage, at the end of the block 200, are formed with oppositely inclined portions 198, see Fig. 30, against which the outer ends of the jaws bear when the jaw-carrier is in its outermost position, and along which they slide as the jaw-carrier is moved inward into the position shown in Fig. 29, and as the outer ends of said jaws slide along the inclined positions they are moved inwardly toward the former while the inner ends thereof remain in engagement with the stationary plates 224. When the jaw-carrier has advanced into the position shown in Fig. 29, the compressing-jaws are brought into position to be engaged by suitable sliding-members for the purpose of moving them toward the former. The sliding-members are herein shown as plates 225, 225, arranged in transverse guideways provided for them in the block 200, beneath the plates 199, at opposite sides of the inner end portion of the vertical passage in the block, and said sliding-members are arranged at opposite sides of the compressing-jaws, and when moved inwardly engage said jaws near their outer ends and first move said outer ends toward each other until they engage each other at the outer end of the former, the inner ends of said jaws still remaining in engagement with the stationary plates 224, and thereafter moving the inner ends of said jaws toward the former while the outer ends thereof are thus held, thereby rocking the jaws so as to compress the blank from its middle toward its ends. To move the sliding-members 225 inward two actuating-levers are employed, see Fig. 28, one for each member, which are represented at 226, 227, said levers being vertically disposed and pivoted to the stationary block 192, at 228. The upper ends of said levers extend over the ends of said sliding-members so that when said levers are moved on their pivots in one direction the upper ends thereof will engage the ends of the sliding-members and move them inward toward each other. The lower end of the actuating-lever 226 has a yielding striking-plate 230 pivoted to it, which is pressed outward by a spring 231, interposed between it and the actuating-lever; and the lower end of the actuating-lever 227 has a similar striking-plate 232 pivoted to it, which is held pressed outward by a spring 233 interposed between it and the actuating-lever, and the movements of said striking-plates are guided by rods 234, which are loosely connected thereto and which extend through holes in the actuating-levers.

It is designed that each striking-plate shall be struck a severe blow in order to move the actuating-lever bearing it, to thrust inward the sliding-member, and that said actuating-levers shall be thus operated simultaneously, and to accomplish this result a disk 235, secured to a shaft 236, has projecting from it two studs 237, 237, arranged diametrically opposite each other, and the striking-plates are arranged in the path of movement of said studs, as the disk is revolved, to be simultaneously struck by said studs; and during each complete revolution of the disk the actuating-levers will be twice engaged and operated. On the opposite side of the disk 235 four studs 238 project, see full and dotted lines, Fig. 2, adapted to be successively engaged by studs 239, two in number, which project downward from the under side of a disk 97, see full and dotted lines, Fig. 2, which is secured to the upright-shaft 25. As the disk 97 revolves the studs 239 successively engage the studs 238 and turn the disk 235 to thereby operate the actuating-levers 226, 227.

To move the sliding-members 225 outward, links 240 are connected thereto, which are connected to arms 241 secured to upright pivot-shafts 242, supported by suitable bearings, and springs 243 encircle said pivot-shafts which are connected at one end to said shafts and at their opposite ends to the arms 241, the tendency of said springs being to move the arms 241 outward and thereby move outward the sliding-members.

The outer ends of the compressing-jaws 216, 216, extend a short distance beyond the end of the jaw-carrier, so that when the jaw-carrier is moved inward by the arm 203, and said jaws are moved toward the former by the inclined walls 198, the outer ends of said jaws will strike the end 353 of the passage in the block 200; and the movement of the parts is so timed that the jaws will engage said end wall 353 before the sliding-members 225, 225, are moved completely inward, and will remain in engagement therewith while the sliding-members operate to move them. Means are provided for forcibly moving the jaw-carrier farther inward, or in other words, for continuing its advancing movement so that the former will be moved longitudinally with respect to the jaws while the latter are held against longitudinal movement by engagement with the end-wall. Such further movement of the jaw-carrier is independent of its regular back and forth movements, and takes place while the sliding-members 225, 225, are operating to rock the compressing-jaws; and the movements of the parts are so timed that the outer ends of the jaws are moved into engagement with each other by the sliding-members to form a molding-face at the outer end of the former while the former is advancing, then the former forces the blank against said molding-face, thereby engaging said blank at the middle, and then, while the former continues to advance and operates to compress the blank at the middle, the inner ends of the jaws are moved inwardly or toward the former by said sliding-members to compress the sides of the blank. During the final advancing or longitudinal movement of the former, while the compressing-jaws are held against the end-wall, the supports for said jaws yield, permitting such movement of the former, and while yielding also permit the inner-ends of the jaws to be moved inwardly by the sliding-members. As a means of thus further moving the jaw-carrier inward, which will be herein referred to as the supplementary means for moving the jaw-carrier, an arm 250 extends forward, which is adapted to engage the rib 28 on the jaw-carrier, and said arm is secured to a pivot-shaft 251 at the upper end of a lever 252, pivoted at a point intermediate its length, at 253, to the main-frame; and said arm 250 is movable on its pivot into and out of operative position, and said lever is movable on its pivot at the proper time to thrust forward the arm 250 to in turn thrust inward the jaw-carrier. To move the arm 250 into and out of operative position a short arm 254 is secured to the pivot-shaft 251, which is connected by a link 255, to the arm 209, and as said arm 209 is moved up and down by the cam-disk 214, the arm 250 will be likewise moved up and down. To move the lever 252 on its pivot it is provided at its lower end with a striking-plate 256, which is pivoted thereto and held in a yielding position by a spring-pressed pin 257, and to the shaft 236 a cross-bar 258 is secured, bearing two oppositely disposed rolls 259 adapted to successively engage said striking-plate and move the lever When the blank is delivered to the compressing-device by the feeding-and-bending device it is disposed edgewise upon the top of the jaw-carrier between the former and jaws, the jaw-carrier at such time being in the position it will occupy when moved inward by the main actuating-means, then as the jaw-carrier is moved inward farther by the supplementary actuating-means said feeding-and-bending device, while still holding the blank, will be moved by and with it, such movement of the feeding-and-bending device being permitted by reason of the sliding connection of the frame 150 with the arm 151, and then as the jaws are operated by the supplementary actuating-means hereinbefore described, said blank will be severely compressed. As the compressing-jaws are operated to engage the blank while held by the feeding-and-bending device they will compress the side portions of said blank toward the former, and such movement of the blank is permitted by the nippers yielding in a direction toward each other, a result due to the employment of the spring 147 and the slots 142 in the link 141. The blank, however, projects a short distance above the former, and it is designed that the edge-portion, thus projecting above the former, shall be turned over to form a flange on the counter. This projecting portion of the blank is the edge-portion which is engaged by the nippers of the feeding-and-bending device. As the nippers engage this edge-portion only of the blank, the blank may be held by said nippers while the compressing-jaws operate to compress it, said jaws moving in a plane beneath the nippers.

A flange forming and compressing device is provided for turning in the flange and for subsequently compressing it. This device consists of a plate 260 mounted on top of the block 200 and held in place thereon between the guide-plates 199, 199. It is movable longitudinally in the guideway, thus provided, forward and backward over the top of the counter-forming mold. The plate bears a stud 261, with or without a roll thereon, which is adapted to be engaged by a cam 262 secured to the upright-shaft 25, to be moved forward over the top of the mold. To move said plate in the opposite direction a cord 265 is attached to it see Figs. 28, 29 and 31 which passes around an idle-pulley 266, thence over an idle-pulley 267, and at its lower end supports a weight 268. The plate 260 is recessed on its under side to receive a flange-forming and flat-pressing-plate 270, which has projecting upward from it three pins 271, 272, 273, which pass through holes in said plate 260. The two end pins 271, 273, have springs 274 encircling them, which press against heads formed on the pins and act to draw up the plate 270 against the under side of the plate 260. The plate 260 thereby supports the plate 270. When the supporting-plate is moved forward the plate 270 is carried forward by it over the top of the mold, and the edge of the blank is turned over to form a flange and the middle pin 272 is carried to a position beneath an arm 275 pivoted at 276 to an ear on the frame. The arm 275 is movable up and down, and when depressed will engage the pin 272 and depress the plate 270. The arm 275 has at its outer end a cross-piece 277 upon which rests one end of a spring 278, the upper end of which rests against a cross-piece 279 on the outer end of an arm 280, secured to a pivot-shaft 281. A weighted arm 282 is secured to said pivot-shaft, which acts by gravity to raise the arm 280, and which is adapted to be raised to depress the arm 280 and thereby, through the spring 278, to depress the arm 275 with a yielding pressure. Guide-rods 285 are provided, connecting the cross-pieces 277 and 279, to assist in maintaining the relative positions of the arms. For the purpose of raising the weighted-arm 282 a roll 290 is journaled to an ear on the disk 90, which is secured to the upright-shaft 25, and during each revolution of said shaft 25, said roll 290 will engage and lift the arm 282 to depress the plate 270. Depression of the plate 270 acts to flat-press the inturned flange on the top of the mold. It will be observed that the movement of the plate 270 to flat-press the flange is at right angles to its forward movement to form the flange. By flat-pressing the flange, as contrasted to compressing it by means of a roller, the flange is pressed in a direction toward the top of the mold and is not puckered or distorted or bent in a direction toward one end of the mold.

After the jaw-carrier has been moved inward and the compressing-jaws have been operated to mold the blank and the flange-forming and flat-pressing device has been operated to form and flat-press the flange thereon, it is designed that the counter thus completed shall be discharged, and to accomplish this result a rod 300 extends longitudinally through a hole in the former 215, and through the rib 28, and is movable longitudinally to project from the former sufficiently to disengage the counter from the former by an endwise movement in order that it may drop through the hole which is formed in the block 200, and which is open when the jaw-carrier is in its outermost position, as shown in Fig. 30. The rod 300 is loosely connected by a link 301 to an arm 302 secured to a pivot-shaft 303 having its bearings in a bracket in the jaw-carrier, and a short arm 304 is secured to said pivot-shaft 303, which is engaged by one end of a spring 305 which encircles said pivot-shaft, the opposite end of said spring extending to a link 306, which is pivotally connected to said link 301. The action of the spring 305 is to move the link 301 in the direction of the arrow, see Fig. 32, and thereby withdraw the discharging-rod 300. The mechanism thus described for withdrawing the discharging-rod provides for moving said rod in a straight line. To move the discharging-rod in the opposite direction, to discharge the counter, a stud 307 is provided on the upper end of the lever 252, which is adapted to be struck by the link 301 when the jaw-carrier is moved outward, and the link 301, thus struck by the stud is moved to push forward the discharging rod.

The end of the discharging-rod 300 is normally disposed flush with the molding-face of the former, and it is shaped or fashioned to correspond to the contour of said molding-face, so as to form a part of the molding-face upon which the blank is molded.

The upright-shaft 25 serves as and constitutes the main-shaft of the machine, and to the upper end thereof a gear-wheel 320 is secured which is engaged by a pinion 321 secured to a short shaft 322, bearing a gear-wheel 323, which is engaged by a pinion 324, secured to a short shaft 325, to which a bevel-gear 326 is secured, which is engaged by a bevel-gear 327 secured to a shaft 328, bearing a belt-pulley 329. This group of mechanism operates to rotate the shaft 25, but in lieu thereof any other suitable means may be employed.

I desire it to be understood that in lieu of the actuating-means herein shown for operating the several essential parts of the machine that other forms of actuating-means may be employed without departing from the spirit and scope of this invention.

Having thus described my invention, what I claim as new and desire to secure by Letters Patent is:—

1. In a counter-forming machine, a blank-carrier consisting of an endless chain, rotatable supports therefor arranged one above the other, a plurality of blank-supports projecting outwardly from said chain, which hold the blanks in horizontal position, transversely with respect to the chain, means for moving said chain continuously and intermittingly operated means for engaging the ends of the blanks and for moving them endwise to remove them from their supports, substantially as described.

2. In a counter-forming machine, a blank-carrier consisting of an endless chain, a plurality of plates secured thereto and two pairs of pins projecting from each plate, disposed to present a space between them for a blank, substantially as described.

3. In a counter-forming machine, a blank-carrier consisting of an endless chain, a plurality of plates secured thereto and two pairs of pins projecting from each plate, disposed to present a space between them for a blank, means for moving said chain continuously and intermittently operated means for engaging the blanks borne by the carrier and for removing them therefrom, substantially as described.

4. In a counter-forming machine, the combination of a curving-device comprising coöperating convex and concave members, a pair of feeding-rolls arranged in front of said curving-device, and automatically operated means for delivering the blanks to said feeding-rolls, whereby flat blanks are automatically delivered to the feeding-rolls and fed to the curving-device and curved transversely in the direction of their length from end to end, substantially as described.

5. In a counter-forming machine, the combination with a curving-device for curving a blank transversely from end to end in the direction of its length, a feeding-and-bending device for the curved blank, and means for conveying the curved blank from the curving-device to the feeding-and-bending device, substantially as described.

6. In a counter-forming machine, the combination of a curving-device for curving a blank transversely from end to end in the direction of its length, a feeding-and-bending device for the curved blank, a transferring-device arranged between said curving-device and said feeding-and-bending device, and means for operating it for transferring the blank from one to the other, substantially as described.

7. In a counter-forming machine, the combination with a curving-device for the blanks and a feeding-and-bending device, of a reversible transferring-device arranged between them for transferring the blanks from one to the other, reversing their position in transit, substantially as described.

8. In a counter-forming machine, the combination of a feeding-device for the blanks, automatically operated means for delivering the blanks thereto, a curving-device for curving the blanks transversely from end to end in the direction of their length, a feeding-and-bending device, and a reversible transferring-device for transferring the blanks from the curving-device to the feeding-and-bending device, reversing their position in transit, substantially as described.

9. In a counter-forming machine, the combination with a curving-device for the blanks, and a feeding-and-bending device, of a clamping-device for the blanks, means for operating it to engage and release the blanks, and means for also moving it to transfer the blanks from the curving-device to the feeding-and-bending device, substantially as described.

10. In a counter-forming machine, the combination with a curving-device for the blanks, and a feeding-and-bending device, of a reversible clamping-device for the blanks, means for operating it to engage and release the blanks, and means for moving it to reverse the position of the blanks and transfer them from the curving-device to the feeding-and-bending device, substantially as described.

11. In a counter-forming machine, the combination with a curving-device for the blanks, and a feeding-and-bending device, of a clamping-device for the blanks having an edge guide, means for operating the clamping-device to engage and release the blanks, means for moving it to transfer the blanks from the curving-device to the feeding-and-bending device, and means for operating said edge-guide to expose the edges of the blanks, substantially as described.

12. In a counter-forming machine, the combination with a curving-device for the blanks, and a feeding-and-bending device, of a clamping-device for the blanks, means for operating it to engage and release the blanks, means for moving it to transfer the blanks from the curving-device to the feeding-and-bending device, and means for feeding the blanks into the clamping-device, substantially as described.

13. In a counter-forming machine, the combination with a curving-device for the blanks and a feeding-and-bending device, of a clamping-device for the blanks, an oscillating shaft bearing it, means for operating the clamping-device to engage and release the blanks, and means for oscillating said shaft to move the clamping-device to transfer the blanks from the curving-device to the feeding-and-bending device, substantially as described.

14. In a counter-forming machine, the combination with a curving-device for the blanks, and a feeding-and-bending device, of a reversible clamping-device for the blanks, an oscillating shaft bearing it, means for operating the clamping device to engage the blanks when in one position, and means for operating it to release the blanks when in its reversed position, substantially as described.

15. In a counter-forming machine, the combination of compressing-mechanism and blank engaging nippers, and means for operating said nippers to engage the blanks, and bend them into heel-form, and means for moving them to deliver the bent blanks to the compressing-mechanism, substantially as described.

16. In a counter-forming machine, the combination with compressing-mechanism for the blank, of means for curving the blank transversely from end to end in the direction of its length, blank-engaging nippers and means for operating said nippers to engage the curved blank and bend it into heel-form and deliver it to the compressing-mechanism, substantially as described.

17. In a counter-forming machine, the combination of compressing-mechanism, a feeding-and-bending device having means to engage the edge of a blank and thereby hold it, said means being movable to bend the blank held by it into heel form, and means to move the feeding-and-bending device to deliver the heel-formed blank to the compressing-mechanism, substantially as described.

18. In a counter-forming machine, the combination of compressing-mechanism, a feeding-and-bending device adapted to engage the edge of a blank, means to operate it to bend the blank thus held by it into heel form, and means to move it to deliver the bent blank to the compressing-mechanism, substantially as described.

19. In a counter-forming machine, the combination of compressing-mechanism, a pivotally supported feeding-and-bending device for the blanks, means for operating it to bend the blanks into heel-form and means for moving it on its pivot to deliver the bent blanks to the compressing-mechanism, substantially as described.

20. In a counter-forming machine, the combination of compressing-mechanism, a feeding-and-bending device for the blank, having blank-engaging means, movable to engage the blank, and to bend the blank into heel-form and means for moving said feeding-and-bending device to deliver the heel-formed blank to the compressing-mechanism, substantially as described.

21. In a counter-forming machine, the combination of compressing-mechanism, a feeding-and-bending device for the blank, means for engaging the long edge of the blank, said means being movable to bend the blank into heel-form, and means for moving the feeding-and-bending-device to deliver the heel-formed blank to the compressing-mechanism, and automatically operated means for presenting the blank with its long edge to the feeding-and-bending device, substantially as described.

22. In a counter-forming machine, the combination of compressing-mechanism, a feeding-and-bending device for the blanks, means for operating it to bend the blanks into heel-form and means for moving it to deliver the bent blanks to the compressing-mechanism, means for curving the blanks transversely from end to end in the direction of their length and means for transferring the curved blanks to the feeding-and-bending device, substantially as described.

23. In a counter-forming machine, the combination of means for curving the blanks transversely from end to end in the direction of their length, a bending-device for bending the curved blanks into heel form, compressing-mechanism for the curved and bent blanks, and means for moving the bending-device to deliver the curved and bent blanks to the compressing-mechanism, substantially as described.

24. In a counter-forming machine, the combination of means for curving the blanks transversely from end to end in the direction of their length, a feeding-and-bending device for delivering the curved blanks to the compressing-mechanism and for bending the blanks into heel-form, means for transferring the blanks from the curving-device to the feeding-and-bending device, means for operating said feeding-and-bending device, and compressing-mechanism for compressing the curved and bent blanks, substantially as described.

25. In a counter-forming machine, the combination of compressing-mechanism, two pairs of blank-engaging nippers, springs for closing the nippers to engage the blank with a yielding pressure, means for opening said nippers, and means for moving said nippers to deliver the blank to the compressing-mechanism, substantially as described.

26. In a counter-forming machine the combination of compressing-mechanism, two pairs of blank-engaging nippers, yielding supports for said nippers permitting movement thereof toward each other, and means for moving said yieldingly supported nippers to deliver the blank to the compressing-mechanism, substantially as described.

27. In a counter-forming machine, the combination of a former, compressing-jaws and means for moving said jaws, and two pairs of blank-engaging nippers for placing a blank between the former and compressing-jaws, and yielding supports for said nippers which are moved by the compressing-jaws engaging the blank held by the nippers, substantially as described.

28. In a counter-forming machine, the combination of compressing-mechanism, and two pairs of blank-engaging nippers, movable on their axes respectively, in opposite directions, and also toward and from each other for bending the blanks into heel-form preparatory to delivering said bent blanks to the compressing-mechanism, substantially as described.

29. In a counter-forming machine, the combination of compressing-mechanism, and two pairs of blank-engaging nippers, movable on their axes respectively, in opposite directions, and pivoted supports for said nippers, for bending the blanks into heel-form preparatory to delivering said bent blanks to the compressing-mechanism, substantially as described.

30. In a counter-forming machine, the combination of compressing-mechanism, two pairs of connected blank-engaging nippers movable on their axes respectively, in opposite directions, and supports for said nippers for bending the blanks into heel-form preparatory to delivering said bent blanks to the compressing-mechanism, substantially as described.

31. In a counter-forming machine, the combination of compressing-mechanism, two pairs of connected blank-engaging nippers, movable on their axes respectively, in opposite directions and pivoted supports for said nippers, for bending the blanks into heel form preparatory to delivering said bent blanks to the compressing-mechanism, substantially as described.

32. In a counter-forming machine, the combination of compressing-mechanism, two pairs of connected blank-engaging nippers, movable on their axes, respectively, in opposite directions, pivoted supports for said nippers and means for connecting said pivoted supports together, substantially as described.

33. In a counter-forming machine, the combination of compressing-mechanism, two pairs of blank-engaging nippers, means for turning them on their axes, respectively, in opposite directions, and also for moving them toward and from each other, to bend the blanks into heel form preparatory to delivering them to the compressing-mechanism, substantially as described.

34. In a counter-forming machine, the combination of compressing-mechanism, two pairs of blank-engaging nippers, pivoted arms bearing them, means for turning said nippers on their axes, respectively, in opposite directions, and also for moving said arms on their pivots, to thereby move said nippers toward and from each other, to bend the blanks into heel form preparatory to delivering them to the compressing-mechanism, substantially as described.

35. In a counter-forming machine, the combination of compressing-mechanism, two pairs of blank engaging nippers, movable on their axes, respectively, in opposite directions, and pivoted supports for said nippers for bending the blanks into heel form, and an oscillating-frame bearing said supports, whereby the blanks are delivered to the compressing-mechanism, substantially as described.

36. In a counter-forming machine, the combination of compressing-mechanism, two pairs of blank-engaging nippers, means for turning them on their axes, respectively, in opposite directions, and for moving them toward and from each other, to bend the blank into heel form, a frame bearing said nippers and means for moving it, to deliver the bent blank to the compressing-mechanism, substantially as described.

37. In a counter-forming machine, the combination of compressing-mechanism, two pairs of blank-engaging nippers movable on their axes, respectively, in opposite directions, and also toward and from each other to bend the blanks into heel-form, and means for opening and closing said nippers, substantially as described.

38. In a counter-forming machine, the combination of compressing-mechanism, two pairs of connected blank-engaging nippers, means for simultaneously opening and closing them and means for moving them on their axes, respectively, in opposite directions, and also toward and from each other to bend the blanks into heel form, substantially as described.

39. In a counter-forming machine, the combination of compressing-mechanism, two pairs of blank-engaging nippers, means for opening and closing them, means for moving them on their axes, respectively, in opposite directions, and also toward and from each other to bend the blanks into heel-form, and an oscillating frame bearing said nippers, substantially as described.

40. In a counter-forming machine, the combination of compressing-mechanism, two pairs of blank-engaging nippers movable on their axes, respectively, in opposite directions, and also toward and from each other to bend the blanks into heel form, means for opening and closing said nippers, a movable frame bearing said nippers, and means for moving it to deliver the bent blanks to the compressing-mechanism, substantially as described.

41. In a counter-forming machine, the combination of compressing-mechanism, a feeding-and-bending device adapted to engage the edge of the blank, means for operating it to bend the blank into heel-form, and means for moving it to deliver the bent blank to the compressing-mechanism and for holding it while the compressing-mechanism operates, substantially as described.

42. In a counter-forming machine, the combination of compressing-mechanism, comprising a former and a pair of compressing-jaws, two pairs of blank-engaging nippers for engaging the edge of the blank, means for operating them to bend the blank into heel-form, means for moving them to deliver the blank to the compressing-mechanism and for holding it while the compressing-jaws move beneath it and compress the blank on the former, substantially as described.

43. In a counter-forming machine, the combination of compressing-mechanism, a pair of blank-engaging nippers, means for moving said nippers to deliver the blanks to the compressing-mechanism and movable supports for said nippers adapted to be moved by the compressing-mechanism while engaging the blank which is held by the nippers, substantially as described.

44. In a counter-forming machine, the combination of compressing-mechanism, a pair of blank-engaging nippers, means for moving said nippers to deliver the blank to the compressing-mechanism, movable supports for said nippers permitting movement thereof toward each other by the action of the compressing-mechanism and a movable support for the nippers permitting bodily movement thereof by the action of the compressing-mechanism, substantially as described.

45. In a counter-forming machine, the combination with movable compressing-mechanism and means for moving it, and a feeding-and-bending device for bending a blank into heel form and for delivering it to the compressing-mechanism, and a movable support for said feeding-and-bending device, permitting movement thereof by and with the compressing-mechanism, substantially as described.

46. In a counter-forming machine, a former, a pair of compressing-jaws, means for moving said jaws toward the former, and means for moving the outer ends of said jaws into engagement with each other to form a molding-face at the outer end of the former, and for then moving their inner ends toward the former while their outer ends are held in engagement, to thereby compress the blank from the middle toward its ends, substantially as described.

47. In a counter-forming machine, a former, a pair of compressing-jaws. means for moving said jaws toward the former, means for moving the outer ends of said jaws into engagement with each other to form a molding-face at the outer end of the former, and for then moving their inner ends toward the former while their outer ends are held in engagement, to thereby compress the blank from the middle toward its ends, and means for also moving the former and jaws, one with relation to the other, while said jaws are held in engagement with each other, substantially as described.

48. In a counter-forming machine, a former, a pair of compressing-jaws, means for moving said jaws toward the former, and means for rocking said jaws whereby their outer ends first engage each other and form a molding face at the outer end of the former, and then their inner ends approach the former while their outer ends are held in engagement, to thereby compress the blank from the middle toward its ends, and means for moving the former longitudinally in a direction toward the outer ends of the jaws while said jaws are in engagement with each other, substantially as described.

49. In a counter-forming machine, a former, a pair of compressing-jaws, supports to which said jaws are pivoted, a jaw-carrier to which said supports are pivotally connected, means for moving said jaws toward the former, means for moving the outer ends of said jaws into engagement with each other at the outer end of the former and form a molding-face thereat, and means for moving the inner ends of said jaws toward the former while their outer ends are held in engagement, to compress the blank from the middle toward its ends, substantially as described.

50. In a counter-forming machine, a former, a pair of compressing-jaws, separate supports for said jaws permitting a bodily movement thereof toward the former, and also separate transverse movements of each end thereof with respect to the former, whereby the outer ends of the jaws may first engage the blank on the former, and then the inner ends thereof, and a jaw-carrier bearing said jaws and supports therefor, substantially as described.

51. In a counter-forming machine, a former, a pair of compressing-jaws, supports for said jaws permitting a rocking movement thereof, and means to engage said jaws and move them toward each other and rock them on their supports to cause their outer ends to first engage each other at the outer end of the former and form a molding-face thereat, and then the inner ends thereof to approach the former, substantially as described.

52. In a counter-forming machine, a former, a pair of compressing-jaws, levers to which said jaws are pivoted, supports to which said levers are pivoted, and a jaw-carrier, and means for moving the outer ends of said jaws into engagement with each other at the outer end of the former and form a molding-face thereat, and for subsequently moving the inner ends thereof toward the former while their outer ends are thus held in engagement, substantially as described.

53. In a counter-forming machine, a former, a pair of compressing-jaws, abutting end-walls on said jaws adapted to engage an abutment, to be thereby held against longitudinal movement, substantially as described.

54. In a counter-forming machine, a former, a pair of compressing-jaws having rocking engaging-faces at their outer ends, which are adapted to engage each other at the inner ends of said engaging-faces and form a molding-face, and to rock, each upon the other, and abutting end-walls on said jaws adapted to engage an abutment to be thereby held against longitudinal movement, substantially as described.

55. In a counter-forming machine, a former, a pair of compressing-jaws movable toward and from the former, sliding-members adapted to engage said jaws and move them toward the former, pivoted actuating-levers for moving said members bearing yielding striking-plates and means for repeatedly engaging said striking-plates to operate said actuating-levers, substantially as described.

56. In a counter-forming machine, a former, a pair of pivoted compressing-jaws, pivoted-levers to which said jaws are pivoted, pivoted-arms to which said levers are pivoted and means for operating said jaws, substantially as described.

57. In a counter-forming machine, a former, a pair of pivoted compressing-jaws, stationary projections on the frame adapted to be engaged by the inner ends of said jaws, pivoted-levers to which said jaws are pivoted, pivoted-arms to which said levers are pivoted and means for operating said jaws, substantially as described.

58. In a counter-forming machine, a jaw-engaging end-wall, a jaw-carrier, a former thereon, compressing-jaws thereon, means for moving said jaw-carrier toward the end wall to move said compressing-jaws into engagement with said end-wall and thereby hold them while the former continues to advance, substantially as described.

59. In a counter-forming machine, a pair of jaw-engaging side-walls, a jaw-engaging end-wall, a jaw-carrier, a former thereon, compressing-jaws thereon, means for moving said jaw-carrier toward the end-wall to move the compressing-jaws into engagement with the said side-walls and also against said end-wall, substantially as described.

60. In a counter-forming machine, a sliding jaw-carrier, a former thereon, a pair of compressing-jaws thereon, means for moving said jaw-carrier and means for operating said compressing-jaws, substantially as described.

61. In a counter-forming machine, a sliding jaw-carrier, a former thereon, a pair of compressing-jaws thereon movable transversely with respect to the former, and restrained from longitudinal movement while the former continues to advance, means for moving said jaw-carrier and means for operating said jaws, substantially as described.

62. In the counter-forming machine, a jaw-engaging end-wall, a sliding jaw-carrier movable toward and from said end-wall, a former thereon, a pair of compressing-jaws thereon, means for moving said jaws transversely, and means for moving the jaw-carrier to force the jaws against said end-wall, whereby they are restrained from longitudinal movement while the former continues to advance, substantially as described.

63. In a counter-forming machine, a pair of jaw-engaging side-walls, a jaw-engaging end-wall, a sliding jaw-carrier, a former thereon, a pair of compressing-jaws thereon, and means for moving said jaw-carrier to move the compressing-jaws into engagement with said side-walls and end-wall, substantially as described.

64. In a counter-forming machine, a jaw-engaging end-wall, a jaw-carrier, a former thereon, compressing-jaws thereon, means for moving said jaw-carrier toward the end-wall to force the compressing-jaws against said end-wall with sufficient pressure to restrain them from longitudinal movement while the former continues to advance, and means for moving said jaws transversely, substantially as described.

65. In a counter-forming machine, a pair of jaw-engaging side-walls, a jaw-engaging end wall, a sliding jaw-carrier, a former thereon, a pair of compressing-jaws thereon, means for moving said jaw-carrier to move the compressing-jaws into engagement with said side-walls, and supplementary means for moving said jaw-carrier to move the compressing-jaws into engagement with said end-wall, substantially as described.

66. In a counter-forming machine, a jaw-engaging end-wall, a sliding jaw-carrier movable toward and from said end-wall, a former thereon, a pair of compressing-jaws thereon, means for moving said jaws transversely, means for moving the jaw-carrier to bring the jaws into position to be operated, and supplementary means for further moving said jaw-carrier to force the jaws against said end-wall whereby they are restrained from longitudinal movement as the former continues to advance, substantially as described.

67. In a counter-forming machine, a block having a recess formed with a jaw-engaging end-wall and a pair of jaw-engaging side-walls, provided with guideways, a sliding jaw-carrier movable in said recess on said guideways, a former thereon, compressing-jaws thereon, and means for moving said jaw-carrier to move said compressing-jaws into engagement with said side-walls and said end-wall, substantially as described.

68. In a counter-forming machine, a block having a recess formed with a jaw-engaging end-wall and a pair of jaw-engaging side-walls, provided with guideways, a sliding jaw-carrier movable in said recess on said guideways, a former thereon, compressing-jaws thereon, and means for moving said jaw-carrier to move said compressing-jaws into engagement with said side-walls and said end-wall, and means for moving said compressing-jaws transversely, substantially as described.

69. In a counter-forming machine, a former, a pair of compressing-jaws and an end-wall, said former and end-wall being movable one toward and from the other, and means for moving said compressing-jaws toward the former and into position between the former and end-wall, substantially as described.

70. In a counter-forming machine, a former, a pair of compressing-jaws and an end-wall, said former and end-wall being movable one toward and from the other, and means for moving said compressing-jaws toward the former and into position between the former and end-wall, and means for subsequently rocking said compressing-jaws, substantially as described.

71. In a counter-forming machine, a former, a pair of compressing-jaws and an end-wall, means for moving said compressing-jaws toward the former and into position between said former and end-wall, said former and end-wall being movable one with relation to the other, and means for moving the movable member after the compressing-jaws have been moved into position between them, substantially as described.

72. In a counter-forming machine, a former, a pair of compressing-jaws and an end-wall, means for moving said compressing-jaws toward the former and into position between said former and end-wall, said former and end-wall being movable one with relation to the other, means for moving the movable-member while the compressing-jaws are being moved into position between them, and supplementary means for moving said movable-member after said jaws have been moved into position between them, substantially as described.

73. In a counter-forming machine, a counter-forming mold and a flat plate, movable one with relation to the other to turn over the edge of the blank to form a flange, and movable one toward and from the other to "flat-press" the flange, substantially as described.

74. In a counter-forming machine, the combination of a counter-forming mold, a flange-forming and compressing-plate, a reciprocating support for said plate, means for moving said support, and means for moving the plate toward the mold to flat-press the flange, substantially as described.

75. In a counter-forming machine, a block having a recess formed with a jaw-engaging end-wall and a pair of jaw-engaging side-walls, a sliding jaw-carrier in said recess, a former thereon, and compressing-jaws there, means for moving said jaw-carrier toward and from said end-wall, a discharging device for the counter, and means for operating it to disengage the counter and permit it to drop through the recess in the block in front of said end-wall when the jaw-carrier is moved outward, substantially as described.

76. In a counter-forming machine, a former, compressing-jaws movable with respect thereto, a bending-device for bending the blanks into heel-form, means for moving it to place the bent blanks between the former and compressing-jaws, a curving-device for curving the blanks transversely from end to end in the direction of their length, and means for delivering the curved blanks to the bending-device, substantially as described.

77. In a counter-forming machine, a former, compressing-jaws movable with respect thereto, means for turning in and compressing a flange on the blank, a bending-device for bending the blank into heel-form and means for moving it to place the bent blank between the former and compressing-jaws, a curving-device for curving the blank transversely from end to end in the direction of its length, and means for delivering the curved blank to the bending-device, substantially as described.

In testimony whereof, I have signed my name to this specification, in the presence of two subscribing witnesses.

ALBERT F. JONES.

Witnesses:
B. J. NOYES,
H. B. DAVIS.